(12) United States Patent
Spiro (10) Patent No.: US 11,071,204 B2
(45) Date of Patent: Jul. 20, 2021

(54) PARKING MANAGEMENT SYSTEM

(71) Applicant: Daniel S. Spiro, Scottsdale, AZ (US)

(72) Inventor: Daniel S. Spiro, Scottsdale, AZ (US)

(73) Assignee: Exposure Illumination Architects, Inc., Scottsdale, AZ (US)

( * ) Notice: Subject to any disclaimer, the term of this patent is extended or adjusted under 35 U.S.C. 154(b) by 0 days.

(21) Appl. No.: 16/841,399

(22) Filed: Apr. 6, 2020

(65) Prior Publication Data

US 2020/0236787 A1 Jul. 23, 2020

Related U.S. Application Data (63) Continuation-in-part of application No. 16/242,666, filed on Jan. 8, 2019, now Pat. No. 10,653,014, which
(Continued)

(51) Int. Cl.

| | | |
|---|---|---|
| *H05K 1/18* | (2006.01) | |
| *H05B 45/00* | (2020.01) | |
| *H05K 1/11* | (2006.01) | |
| *H05K 1/02* | (2006.01) | |
| *H01F 41/04* | (2006.01) | |
| *H01F 41/02* | (2006.01) | |
| *H01F 27/28* | (2006.01) | |
| *H01F 27/24* | (2006.01) | |
| *H04W 88/08* | (2009.01) | |
| *F21S 8/08* | (2006.01) | |

(Continued)

(52) U.S. Cl.
CPC .............. *H05K 1/181* (2013.01); *F21S 8/086* (2013.01); *F21V 23/0442* (2013.01); *F21V 23/06* (2013.01); *F21V 29/74* (2015.01); *H01F 27/24* (2013.01); *H01F 27/2804* (2013.01); *H01F 41/02* (2013.01); *H01F 41/041* (2013.01); *H04W 88/08* (2013.01); *H05B 45/00* (2020.01); *H05B 47/19* (2020.01); *H05K 1/0298* (2013.01); *H05K 1/115* (2013.01); *F21W 2131/103* (2013.01); *H05K 1/0233* (2013.01); *H05K 1/165* (2013.01); *H05K 2201/086* (2013.01); *H05K 2201/0929* (2013.01); *H05K 2201/1003* (2013.01); *Y02P 70/50* (2015.11); *Y10T 29/4913* (2015.01); *Y10T 29/49117* (2015.01)

(58) Field of Classification Search
CPC ...... G06Q 30/0266; G07B 15/02; G08G 1/14; G08G 1/202; G08G 1/146
See application file for complete search history.

(56) References Cited

U.S. PATENT DOCUMENTS

| 6,307,330 B1 | 10/2001 | So |
|---|---|---|
| RE38,767 E | 8/2005 | Wedell et al. |

(Continued)

FOREIGN PATENT DOCUMENTS

| CN | 202617435 | 12/2012 | | |
|---|---|---|---|---|
| CN | 203352881 | 12/2013 | | |
| WO | WO-2015193059 A1 * | 12/2015 | ........... | G05D 1/0246 |

*Primary Examiner* — Mirza F Alam
(74) *Attorney, Agent, or Firm* — Michael Carrillo; Irina Sullivan; Barnes & Thornburg LLP (57) ABSTRACT

A plurality of electronic signaling and image processing devices coupled to street roadside illumination poles, communicatively networked with one another, vehicles, and at least one remote client to manage all roadside municipal parking stalls in the pole's vicinity in real time.

28 Claims, 4 Drawing Sheets

Related U.S. Application Data is a continuation of application No. 15/884,107, filed on Jan. 30, 2018, now Pat. No. 10,215,351, which is a continuation of application No. 14/757,923, filed on Dec. 28, 2015, now Pat. No. 9,885,451, which is a continuation-in-part of application No. 14/166,056, filed on Jan. 28, 2014, now Pat. No. 9,829,185.

(60) Provisional application No. 61/767,035, filed on Feb. 20, 2013, provisional application No. 62/096,394, filed on Dec. 23, 2014.

(51) Int. Cl.
*F21V 23/06* (2006.01)
*F21V 23/04* (2006.01)
*F21V 29/74* (2015.01)
*H05B 47/19* (2020.01)
*H05K 1/16* (2006.01)
*F21W 131/103* (2006.01)

(56) References Cited

U.S. PATENT DOCUMENTS

| | | |
|---|---|---|
| 7,893,848 B2 * | 2/2011 | Chew ................. G08G 1/14 340/932.2 |
| 8,475,002 B2 | 7/2013 | Maxik et al. |
| 2007/0109142 A1 | 5/2007 | Mccolloug |
| 2012/0038281 A1 | 2/2012 | Verfuerth |
| 2012/0038490 A1 | 2/2012 | Verfuerth |
| 2012/0323643 A1 * | 12/2012 | Volz ................. G06Q 30/0266 705/13 |
| 2014/0072178 A1 * | 3/2014 | Carbonell ........... G06K 9/00785 382/105 |
| 2017/0270795 A1 * | 9/2017 | Vaidyanathan ........ G08G 1/148 |
| 2019/0088128 A1 * | 3/2019 | Adireddy ............... G08G 1/146 |

\* cited by examiner

| PROCESS | VEHICLE | IDS | IDS NETWORK | BILLING CENTER | PARKING ENFORCEMENT | FIRST RESPONDER | MUNICIPAL ENG. DEPT. | 3RD PARTY APP (OPTIONAL) |
|---|---|---|---|---|---|---|---|---|
| SEARCH FOR A PARKING STALL | ● | ■ | ■ | | | | | |
| ENTERING A RESERVATION | ● | ■ | ■ | ■ | | | | |
| NAVIGATION TO DESTINATION | ⊙ | | □ | | | | | ⊙ |
| UPON ARRIVING AT IDS VICINITY | □ | ■ | | | | | | |
| UPON OCCUPYING RESERVED SPACE (AUTHORIZED) | ■ | ■ | ■ | ■ | | | | |
| UPON OCCUPYING RESERVED SPACE (UNAUTHORIZED) | □ | ■ | | ■ | ■ | | | |
| UPON FINDING RESERVED SPACE OCCUPIED | □ | ■ | | | ■ | | | |
| UPON MISTAKENLY PARKING AT WRONG RESERVED STALL | ■ | ■ | ■ | ■ | | | | |
| UPON VACATING A STALL | □ | ■ | | □ | | | | |
| UPON IDENTIFYING UNAUTHORIZED OBJECT | □ | ■ | | ▣ | □ | | ▣ | |
| UPON IDENTIFYING ALLOWED OBJECT | ■ | ■ | | | | | ▣ | |
| UPON IDENTIFYING RECOGNIZED THREAT | □ | ■ | | | □ | ▣ | ▣ | |
| USER REPORTING PARKING VIOLATION | ● | ■ | | | ■ | | | |
| FIRST RESPONDERS ZONE AVOIDANCE | ■ | ■ | ■ | | ⊙ | ● | ⊙ | |
| CHANGE IN ZONE RULES BY ENG. | ■ | ■ | ■ | ◉ | ◉ | | ◉ | |
| PARKING DEPT. DYNAMIC PRICING CHANGE | □ | ■ | ■ | ◉ | ◉ | | | |

LEGEND:
● HUMAN TO MACHINE ACTION INITIATED
● HUMAN TO MACHINE INTERACTION
⊙ HUMAN TO MACHINE INTERACTION DISCRETIONARY
◉ HUMAN TO HUMAN
■ MACHINE TO MACHINE
▣ MACHINE TO HUMAN DISCRETIONARY
□ HUMAN TO HUMAN DISCRETIONARY
□ HUMAN TO HUMAN VIA MACHINE

FIG 4

PARKING MANAGEMENT SYSTEM

CROSS-REFERENCES TO RELATED APPLICATIONS

This application is a continuation-in-part of and claims the benefit of U.S. patent application Ser. No. 16/242,666 filed Jan. 8, 2019; which is a continuation of and claims the benefit of U.S. patent application Ser. No. 15/884,107 filed Jan. 30, 2018; which is a continuation of U.S. patent application Ser. No. 14/757,923 filed Dec. 28, 2015; which is a continuation-in-part and claims the benefit of U.S. patent application Ser. No. 14/166,056 filed Jan. 28, 2014; which claims the benefit of U.S. Provisional Application No. 61/757,340 filed Jan. 28, 2013 and U.S. Provisional Application No. 61/767,035 filed Feb. 20, 2013, and also claims the benefit of U.S. Provisional Application No. 62/096,394 filed Dec. 23, 2014, and incorporates the disclosure of each application by reference. To the extent that the present disclosure conflicts with any referenced application, however, the present disclosure is to be given priority.

BACKGROUND OF INVENTION

In this past decade, advancements in managing roadside parking systems have introduced several solutions, retiring the roadside meters. The most common solutions today include:
   A. Associating a billing party, parking zone/district/city, and vehicle license plate
   B. Purchasing weekly, monthly, or annual passes
   C. Employing parking stall sensing devices embedded in the road that relay the occupancy status of the stall to a remote location
   D. Employing a camera supported by analytics to monitor the occupancy status of each parking stall.

The above solutions alone or in conjunction with one another have significantly improved managing street parking systems, reducing staff dedicated to maintaining metering systems, parking enforcement, and revenue collection. They also increased user convenience by not having to keep watching the clock and occasionally running to add more coins in the meter. However, despite these noted advances, the current state of the art has gaps. These gaps can be explained from the perspective of the parking system owner, in this example, a municipality, and users (vehicle drivers) of the parking stalls.

The municipality's needs include:
   A. A 24/7 understanding of occupancy status of each vehicle stall throughout the city.
   B. A tool to maximize revenue through parking stall utilization.
   C. A means to minimize parking enforcement overhead costs.
   D. A means to minimize roadway system maintenance.
   E. A means to reduce street traffic load.
   F. A means to reduce urban air and sound pollution.
   G. A means to be alerted about obstructions within parking stall/s.
   H. An area to facilitate safe pickups and drop-offs for self-driving vehicle passengers.

The driver's needs include:
   A. Advance knowledge of parking stall availability in the vicinity of the destination.
   B. Capability to reserve a parking stall.
   C. A means of automated billing between a vehicle and/or driver and municipal parking systems.

The above noted points for the municipality and the driver expose perhaps the biggest gap in today's art. This gap results in drivers needlessly circling city blocks several times before finding a parking stall. Employing the Intermediate Device Structure 10 (IDS), the present innovation fills in the present art's gaps, providing a seamless process while requiring minimal driver interaction with parking systems.

SUMMARY OF THE INVENTION

An embodiment includes a parking management system comprising: a decentralized parking manager device coupled to a pole structure electrically connected to a power source and communicatively coupled to a network of like municipal pole mounted decentralized parking manager devices and at least one of a remote client, a mobile device, or combinations thereof, wherein: the parking manager device is comprised of at least one of: a processor, resident memory with stored code that can include AI code, a bi-directional communication module, a sensing device, or combinations thereof; the parking manager device manages a parking zone within its vicinity having at least one parking stall; the parking manager is configured to have a unique address and its zone and parking stall(s) are associated to the manager with unique sub-addresses; the parking manager device unique address is associated with at least one of a street address and/or a building address; a user with access to the internet and/or other online service can view an online map showing roadside parking stall vacancies in the vicinity of an entered address; and the vehicular parking stall vacancies can be shown in real time at any time of day or night year round.

Another embodiment includes A parking management system comprising: a municipal network of decentralized parking manager devices coupled to pole structures electrically connected to a power source and communicatively coupled to at least one of a remote client and a mobile device, wherein: each parking manager device is comprised of at least one of: a processor, resident memory with stored code that can include AI code, a bi-directional communication module, a sensing device, or combinations thereof; each parking manager device manages a parking zone within its vicinity having at least one parking stall; each parking manager is configured to have a unique address and its zone and parking stalls are associated to the manager with unique sub-addresses; each parking manager device unique address is associated with at least one of a street address and/or a building address; a wireless device integral to a vehicle, a desktop device and/or a portable device can access at any time an interactive map displaying at least one of streets, building addresses and/or roadside parking stall information; and a user entering an address through a wired or wireless device and/or vehicle and/or portable wireless device can in real time see roadside parking stall vacancies in the vicinity of the address entered.

Another embodiment includes A parking management system comprising: an interactive parking map configured to assist drivers navigate their way to a parking stall, wherein: the parking map is accessible online at any time from a vehicle's integral touch and/or audio interactive display and/or a wired or wireless device; the parking map can locate and show at least one of a street name and/or a building address; the parking map can in real time shows parking vacancies in the vicinity of an entered street and building address; and real time information can be communicated to the map application from at least one of pole mounted parking manager, parking enforcement department, traffic/parking engineering department, and/or first responders.

Yet another embodiment includes a method of using a parking management system, the method comprising: managing a parking zone having parking stalls, the parking zone within a vicinity of a decentralized parking manager device coupled to a pole structure electrically connected to a power source and communicatively coupled to a network of like municipal pole mounted decentralized parking manager devices and at least one of a remote client, a mobile device, or combinations thereof; assigning a unique address to the parking manager device and assigning unique sub-addresses to the parking zone and parking stalls; associating the unique address of the parking manager with at least one of a street address or a building address; and displaying vacancies in parking stalls of the parking zone in real time on an online map.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EMBODIMENTS

The present innovation is claims priority to the US patents and applications listed above, employing the IDS 10 device. The present innovation also assumes the following:
1. An IDS device is mechanically and electrically coupled to most or all the street lighting poles 2 of a municipality or any entity that occupies a large area having streets. Accordingly, any discussion throughout this disclosure regarding a municipality applies equally to any other entity that occupies a large area having streets.
2. All IDS devices are communicatively coupled to one another and at least one remote municipal device.
3. All IDS devices are communicatively coupled to at least one mobile device 220 wherein the mobile device can be embedded in a vehicle 215, or portable device 230 carried by humans or humans and animals.
4. All IDS devices can be communicatively coupled to at least one stationary device.
5. All devices can operate 24/7, year-round.
6. All users' mobile devices 220, portable devices 230 or stationary devices can be associated with at least one of billing party information, and at least one of: a vehicle registration number, and a vehicle license plate number.
7. A vehicle transceiver 126 can be communicatively coupled to a portable device 230.

The present innovation employing the municipal-wide network of IDS 10 devices gives a driver 275 real time information about available parking stalls 205 in the vicinity of his/her destination. The information is readily available online any time, and can be accessed typically through a municipality-sponsored app. The app can be a layer in a GIS map 210 provider that regularly updates its maps. The municipal parking stalls 205 layered map 210 can also be updated by the municipal parking system engineering department when changes occur.

The building blocks of the parking management solution begin with the IDS 10 device coupled to a pole-mounted roadway luminaire structure 2. Each pole mounted roadway luminaire structure 2 is typically spaced apart from other structures at a distance no greater than permitted by code for public roadway lighting uniformity. As a result, the spacing between the poles is regulated and commonly repeated. Typical pole spacing ranges from 75 ft to 300 ft. The width of the typical parking stall 205 ranges from 9 ft to 10 ft, and the parking stall 205 length ranges from 18 ft to 22 ft. Thus, a street light pole structure 2 with a coupled IDS 10 device located within a municipal pole grid with 120 ft spacing can manage approximately 13 vehicles 215 parked perpendicularly to the curb or 6 vehicles 215 parked parallel to the curb. The association of the pole 2 with each parking stall 205 within a midpoint between poles 2 can be applied throughout the municipality, forming an additional layer to the street names and building addresses shown on the GIS map 210. The IDS 10 resident devices associated with a parking management system include at least one of: a processor 124 with resident memory and AI code 131, a transponder 126, a camera 60 collecting input processed by the processor's 124 AI code 131, and a unique address 250.

The IDS manages its designated parking stall 205 zone 200 by:
1. Assigning each of the parking stalls 205 a unique address 255 that is also associated with the IDS 10 unique address 250.
2. Associating the IDS 10 address 250 with the street and building addresses falling within the length of the parking zone 200 street frontage, in front of the building/s.
3. Receiving and relaying information between mobile devices 220 and remote client/s wherein the client/s can be a municipal department/s 263, a driver 275, or an authorized third party 267, and the information received and relayed is pertaining to the associated parking zone 200.

Once the above parameters are in place, the decentralized IDS 10 receives and transmits sensed signals and visual information. The information received is processed 124 by the AI code 131, making the IDS 10 device self-aware of all parking-related activity within its designated zone 200 24/7.

At the other end of the IDS 10 network system, a driver 275 looking for a parking stall 205 can enter a query at any time looking for a stall 205 in the vicinity of a destination. A query can be entered into the vehicle dashboard display device 220, a portable device 230, or a portable device 230 coupled communicatively to the vehicle 215 dashboard device 220. It is assumed that at least one of the vehicle/s 215 or the portable device/s 230 can have interactive online communication with the parking management system site.

Upon physically entering a destination address into the vehicle's 205 mobile device 220 and/or or the portable device 230, the device/s display shows a zoomed-in GIS map 210 of the nearest parking stall 205 to the destination entered. The system can provide this information in real time by beginning its parking stall 205 query with the IDS 10 associated with the entered address. In the event that no parking stalls 205 are available within that parking zone 200, the app expands the search to neighboring IDS's 10 until a stall 205 is located. Once a stall 205 is located, the display prompts the driver 275 to choose between reserving the stall 205 shown, or not reserving it. If the driver 275 opts to reserve the stall 205, a screen then appears displaying payment options. The options can include credit card, subscription/auto charge, or a pass. Upon entering the payment method and information, a secondary prompt may request information about at least one of: the vehicle 215 registration number or a license plate. Once the association is made, and authorization for the financial transaction has been approved, the parking stall 205 is reserved and the vehicle's mobile device 220 and/or the portable device 230 receives a unique authorization code 260. Concurrently, the IDS 10, managing the reserved parking stall 205, can receive the authorization code 260 and can anticipate the arrival of the vehicle 215 reserving the parking stall 205. In some applications, neighboring IDS 10 devices can also receive the authorization code 260 and help guide the vehicle 215 to its reserved parking stall 205. Also, upon the vehicle 215 vacating the parking stall 205, the neighboring IDS's 10 can confirm the vehicle's 215 departure. The authorization code 260 turns into the vehicle's 215 transmitted homing signal. This innovation assumes that all future generation vehicles 215 are likely to have an in-built transponder 126 communicatively linked to a municipal website and/or the internet. It is also conceivable that the municipal residents' vehicles 215 or vehicles 215 and billing information can be stored in the vehicle's 215 processor storage device 124. This data simplifies the entire parking process. Both the driver 275 opting to reserve a parking stall 205 and a driver 275 choosing not to reserve a parking stall 205 can use the online GIS map 210 to reach their destination in the shortest time, wherein the app in real time displays the parking stall 205 availability. The app can also interact with other third-party 267 apps such as a navigational program and roadway alerts. Upon arrival in the vicinity of the reserved parking stall 205, the mobile dashboard display 220 of the vehicle 215 reserving the parking stall 205 and/or the portable device 230 will intermittently flash the reserved symbol. As the vehicle 215 approaches the designated location, the flashing symbol will become more rapid, and upon arrival the symbol becomes a solid light. The driver 275 pulls into the parking stall 205 and the parking billing proceeds while the display for all other vehicles 215 changes from reserved to occupied.

Upon arriving in the vicinity of the reserved parking stall 205, the vehicle's 215 homing signal is received by the IDS 10 and authenticates it with the previously received code. The IDS 10 then initiates an efficient parking arrival process by signaling a flashing image on the vehicle's dashboard display 220. To make an analogy, the IDS 10 acts as an air traffic controller, and when an aircraft comes within the range of the airport, the air traffic controller takes over by first authenticating the aircraft's homing device signal. Then, the IDS 10 camera 60 input processed 124 by the IDS 10 AI code 131 confirms that the vehicle is indeed parked in its designated parking stall 205. The camera 60 then continues to monitor the vehicle 215, having time stamped imagery if necessary, until its sensed and processed 124 input confirms that the vehicle 215 has vacated the parking stall 205, at which time the billing stops. If the vehicle 215 enters an undesignated parking stall 205, an error message can be sent to the driver 275 also showing on the vehicle 215 display screen 220, letting the driver 275 know that his/her vehicle 215 is parked in the wrong parking stall 205 and the vehicle 215 may be ticketed. Since the IDS 10 AI code 131 can be accessed and remotely programmed, changes in the parking rules and the messaging on the display can change. Such changes can include allowing parking in any parking stall 205 within a parking zone 200 or changing parking fee schedule per time of day/week, demand or scheduled event. A driver 275 who has not reserved a parking stall 205, upon identifying a vacant parking stall 205 in the vicinity of his/her destination, drives toward the parking stall 205, and upon parking initiates the billing process wherein the IDS 10 camera 60 input acknowledges and confirms the vehicle's 215 location. As with the reserve parking process, the vehicle 215 mobile device 220 and/or the portable device 230 receives an authorization code 260. The portable device 230 can be removed from the vehicle 215 without disrupting the parking lease due to signal loss, as the visual confirmation continues. The lease of the reserved parking stall 205 vehicle 215 and the onsite initiated lease terminate when the visual input for the vehicle 215 is no longer observed by the IDS 10 camera 60, or the camera 60 and the homing signal if the vehicle's 215 embedded transponder 126 is associated with the lease.

The IDS 10 parking management system can efficiently enforce the municipal parking code. A driver 275 who violates the code by occupying a parking stall 205 illegally can be warned by a text, if within the time allotted, he/she has not obtained a lease authorization 260. Such a warning can be sent if the vehicle 215 or vehicle owner is recognized. Regardless, the IDS 10 or the IDS 10 in conjunction with other IDS 10 devices can initiate ticketing the vehicle 215 and/or towing the vehicle 215. The IDS 10 can also register on the GIS display map 210 where an illegally parked vehicle 210 is parked. In such events, if a reserved parking stall 205 has been taken illegally, the driver 275 of the reserved parking stall 205 will be notified and be re-directed to the nearest vacant parking stall 205. If there is no vacant parking stall 205, the reserved parking stall 205 billing will be voided.

Occasionally at least one parking stall 205 may be occupied by an object other than a vehicle 215. The IDS' 10 AI code 131 is programmed, or programmed and field-trained through self-learning algorithms to recognize vehicles 215 and all objects native to the IDS' 10 camera's 60 field of vision within its managing parking zone 200. When objects other than vehicles 215 and known native objects are seen inside the parking zone 200, the IDS 10 AI code 131 through its analytical processes discerns whether the objects pose a threat to humans or humans and property. For example, a dumpster placed in a parking stall 205 with a permit may be allowed wherein a contractor prepays the municipality for using the parking stall 205 throughout the duration of the construction. However, if a tree branch or any other debris appears inside the stall, an alert can be issued immediately, as the branch or debris could pose a safety hazard.

Summarizing the typical parking query, parking and billing process, the IDS 10 network via at least one of IDS's node to another IDS's node and/or the cloud updates its city-wide parking stall 205 status on a GIS map 210 in real time. In so doing, the municipal app perpetually refreshes the online parking stall 205 GIS map 210 of the municipality. When a driver 275 enters an address query using a mobile device 220 and/or a portable device 230, the query refreshes the GIS map 210 at the closest parking stall 205 to the address entered, and allots a time window for the inquirer to reserve the parking stall 205. The parking stall 205 is reserved through an online billing site and once the billing is pre-authorized, the billing site sends a unique authorization code 260 to the reserving party and to the IDS 10 managing the selected parking stall 205. It can also send the unique authorization code 260 to neighboring IDS's 10. The IDS 10 or the IDS 10 and its neighboring IDS's 10 enter into standby mode awaiting receipt of the homing signal of the reserved vehicle 215. Once the vehicle's 215 signal is received and authenticated, the vehicle 215 is directed to its reserved parking stall 205. The parking billing continues until the vehicle 215 vacates the parking stall 205, at which time the IDS 10 initiates the billing process with the online billing site. The billing site may then invoice the financially responsible party. The process of authenticating and subsequently monitoring and billing is the same for vehicles 215 arriving and occupying a vacant open parking stall 205 without reservations. The GIS map 210 is available online to anyone 24/7. Any anomalies may be brought to other municipal departments' 263 attention in real time, including parking enforcement, first responders, and parking engineering departments. The municipal parking management GIS map 210 can be a layer incorporated with third party 267 navigation and/or road condition reporting apps.

The key benefit of the present innovation provides users 24/7 visibility to municipal street parking. The utilities derived include reduced driver 275 costs and municipal operating costs, reduced noise and air pollution, reduced road congestion, and reduced driver 275 time to destination. In addition, the municipality gains tools to increase parking revenues while the driver 275 benefits from having a tool to quickly find the most convenient available parking stall 205.

Figure 1:
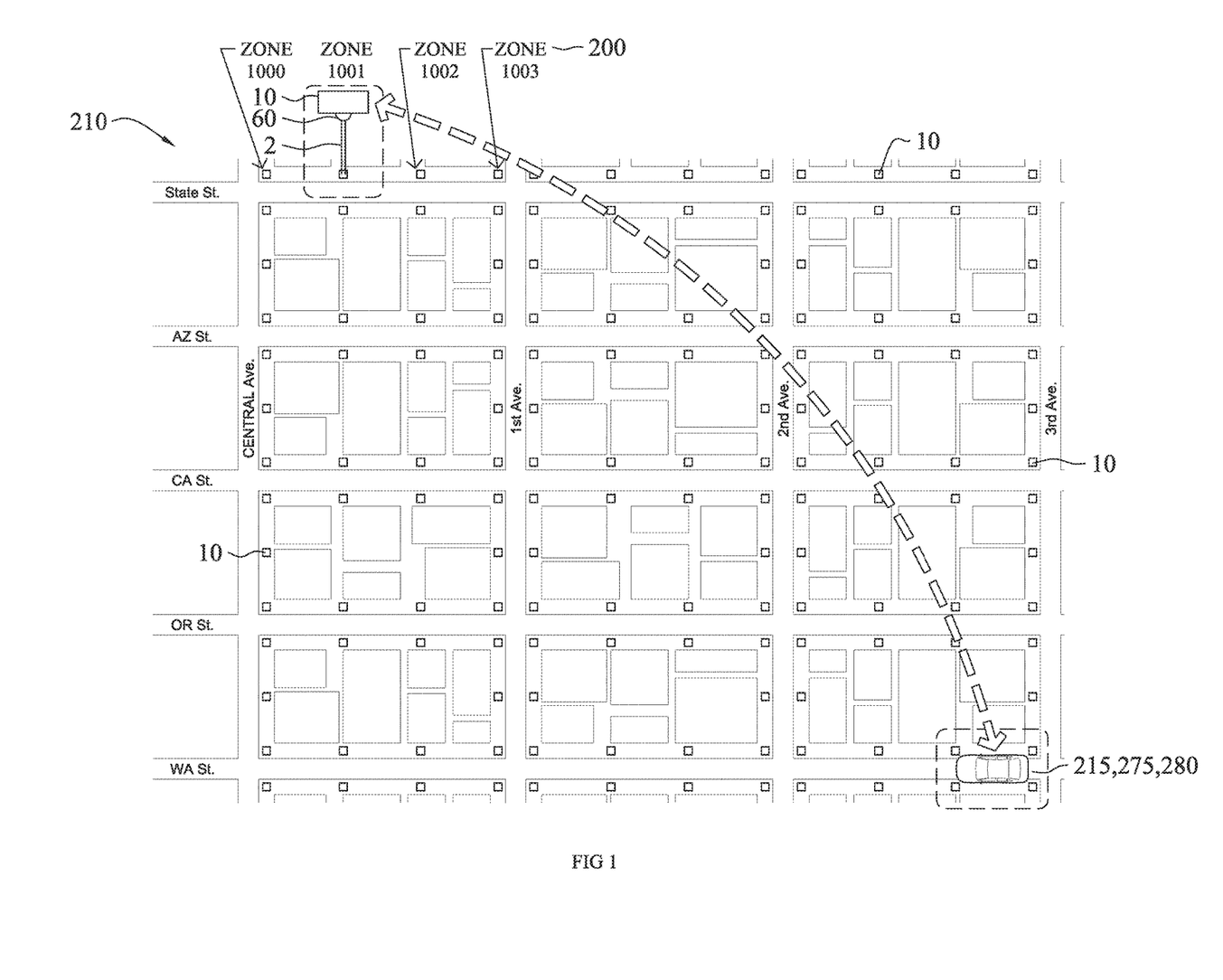
FIG. 1 shows an example of a city plan populated with IDS devices coupled to roadway lighting pole structures, according to an embodiment.

FIG. 1 shows a municipal street map with roads and buildings. On both sides of the streets IDS 10 devices are coupled to roadside pole mounted streetlights 2. The spacing the streetlight poles 2 is highly regulated where most of the poles 2 are evenly spaced. Where roadside parking exists, the pole's 2 coupled IDS 10 manages a designated parking area in the vicinity of the pole 2 referred herein as a parking zone 200.

Each pole 2 mounted IDS 10 device has a unique address 250 that associates the IDS 10 device to a specific location on a GIS map 210, resulting in city-wide roadway coverage by the pole 2 mounted IDS 10 devices. The IDS 10 devices are shown in this figure as black squares. A vehicle 215 is shown at the bottom right side of the figure. The vehicle's driver 275 is looking for parking stall 205 availability in the vicinity of 6522 North State Street. In this example, the driver 275 has an appointment in the building and no time to drive around the block looking for a parking stall 205. Once the address is entered into the vehicle's 215 dashboard mobile display device 220 or a portable device 230, a search for the parking stall 205 begins, starting at the IDS 10 device nearest to the address entered. In this example, zone 1001 IDS 10 acknowledges that a parking stall/s 205 is/are available. At this point, the driver 275 can opt to reserve a parking stall 205 allowing the billing to begin or wait until arrival at the destination. The communication between the vehicle mobile device 220 and/or the portable device 230 can be wireless. All other clients' communication can be wireless, wired, or wired and wireless, via satellite, via surface and/or pol mounted communication nodes, and/or below grade. The bi-directional communication clients can include a vehicle dashboard mobile device 220, a portable device 230, a network of IDS 10 devices, a billing department, a parking enforcement department, first responders, and municipal engineering department. The communication can be secured between users with permission granted for the various communication channels. The driver 275 of the vehicle 215 may opt to incorporate the municipal parking app into a navigational app and/or roadway event update apps. The municipal parking management app is online available to all 24/7. The app is continuously refreshed and any parking stall 205 vacancy is shown in real time.

Figure 2:
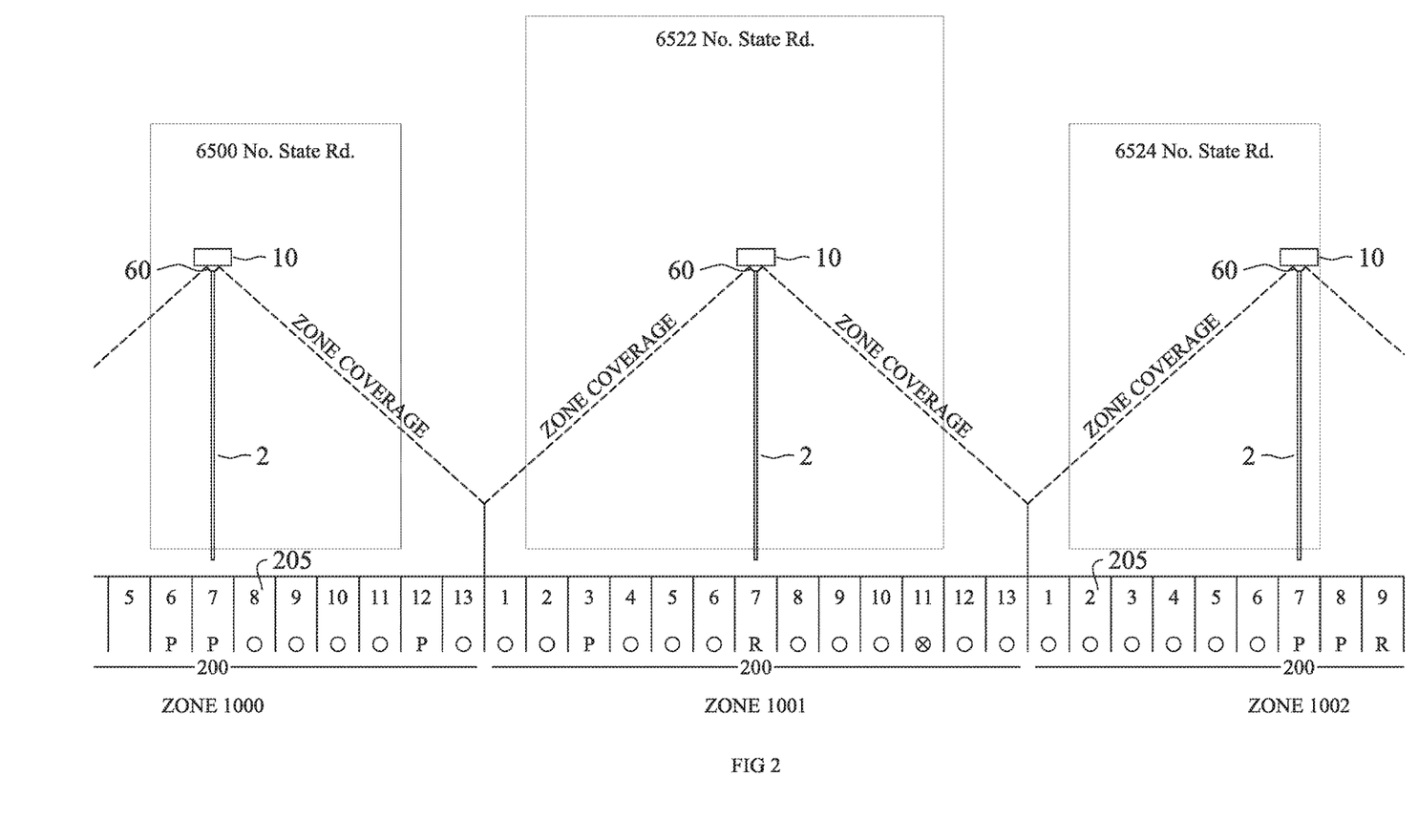
FIG. 2 shows a street elevation with pole mounted IDS devices managing several roadside parking zones, according to an embodiment.

FIG. 2 shows an elevation of the street with three IDS 10 devices, each managing a parking zone 200. The driver 275 referenced in FIG. 1 looking for a parking stall 205 near the address of 6522 North State Street has reserved a parking stall 205 managed by the zone 1001 IDS 10 manager. In this example, each IDS 10 zone 200 manages 13 vehicular parking stalls 205. Zone 1001 IDS 10 is shown in front of the 6522 North State Street building and the parking zone 200 address is associated with the building address. The driver 275 approaching the designated parking stall 205 can be assisted by neighboring IDS 10 guidance signals. Once the vehicle 215 is parked at its designated parking stall 205, the IDS 10 integral camera 60 monitors the vehicle's 215 parking status. In this figure, the reserved designated parking stall 205 is identified by the letter R. The vacant parking stall 205 is identified with the letter P. Occupied parking stalls 20 are identified with a solid O, and an illegally parked vehicle 21 is identified with an open letter O with a cross over it. Symbols and letters are shown in the parking management map 210 in real time. These symbols continuously change as parking stall 205 occupancy status changes. In the example, the reserved symbol will change to occupied upon the driver's 275 parking the vehicle 215 inside the parking stall 205. The symbols can be color coded red and green. Reserved, occupied and illegally parked vehicle stalls 205 show in red, while available parking stalls 205 show in green.

It is anticipated that self-driving vehicles 215 will soon be available to pick up and drop off passengers in urban settings (not shown). Using the parking app, a person can order a pick-up at his/her location, also entering the destination address. As with the vehicles 215 driven by a human, the self-driving vehicle 215 can pick up a passenger at the designated parking zone 200 parking stall 205 near the location of the person ordering the pick-up, and can drop off the person at a designated parking zone 200 parking stall 205 near his/her destination. The pick-up and the drop-off designated parking stalls 205 can be dedicated for self-driving vehicles 215 and may have built-in amenities to auto-charge or auto-fuel the vehicle 215.

The IDS 10 parking management system anticipates self-driving vehicles 280 sharing the roadways and parking stalls 205 with vehicles 215 driven by drivers 275.

For passenger/s 285 riding in a self-driven vehicle 280, most interactive processes are the same as using the municipal parking app. The new processes and/or modified processes can include at least one of:

A. Ordering a self-driving vehicle 280.
B. Including parking stall 215 fees for a ride with parking associated.
C. Including within the ride multiple pick up and/or drop off locations.
D. Receiving charges for at least one of: fuel charge, vehicle rental fee, multiple pick up and/or drop off, parking stall 205 if used (including reservation fee if applicable) and wait time for the vehicle 215.

The self-driving vehicle 280 employs a processor with resident memory 124, AI code 131, at least one sensing device, and a transceiver 126. It is likely that all future self-driving vehicles 280 will include at least one interactive passenger console with a graphic interface. In addition, it is likely that an audio or an audio/visual app will enable a passenger 285 to communicate with the vehicle 215. This feature will allow the passenger 285 to change the destination address during the ride. The self-driving vehicle 280 can display the municipal parking system map 210 showing the navigational route to the destination. The route can be altered by the passenger 285 interacting with the display's interface.

Upon entering a query for the nearest available self-driving vehicle 280 to the passenger's 285 pickup location, the query searches system wide starting the search from the pickup IDS zone nearest to the pickup location. From there, the search can propagate in a ripple-like fashion throughout the IDS 10 network system and/or send a message to all self-driving vehicles 280 that are not under contract to report their location and then select the nearest one to the passenger's pickup zone. The self-driving vehicle 280 can be shown on the display by a symbol and the vehicle route can be tracked on a display map 210.

Figure 3:
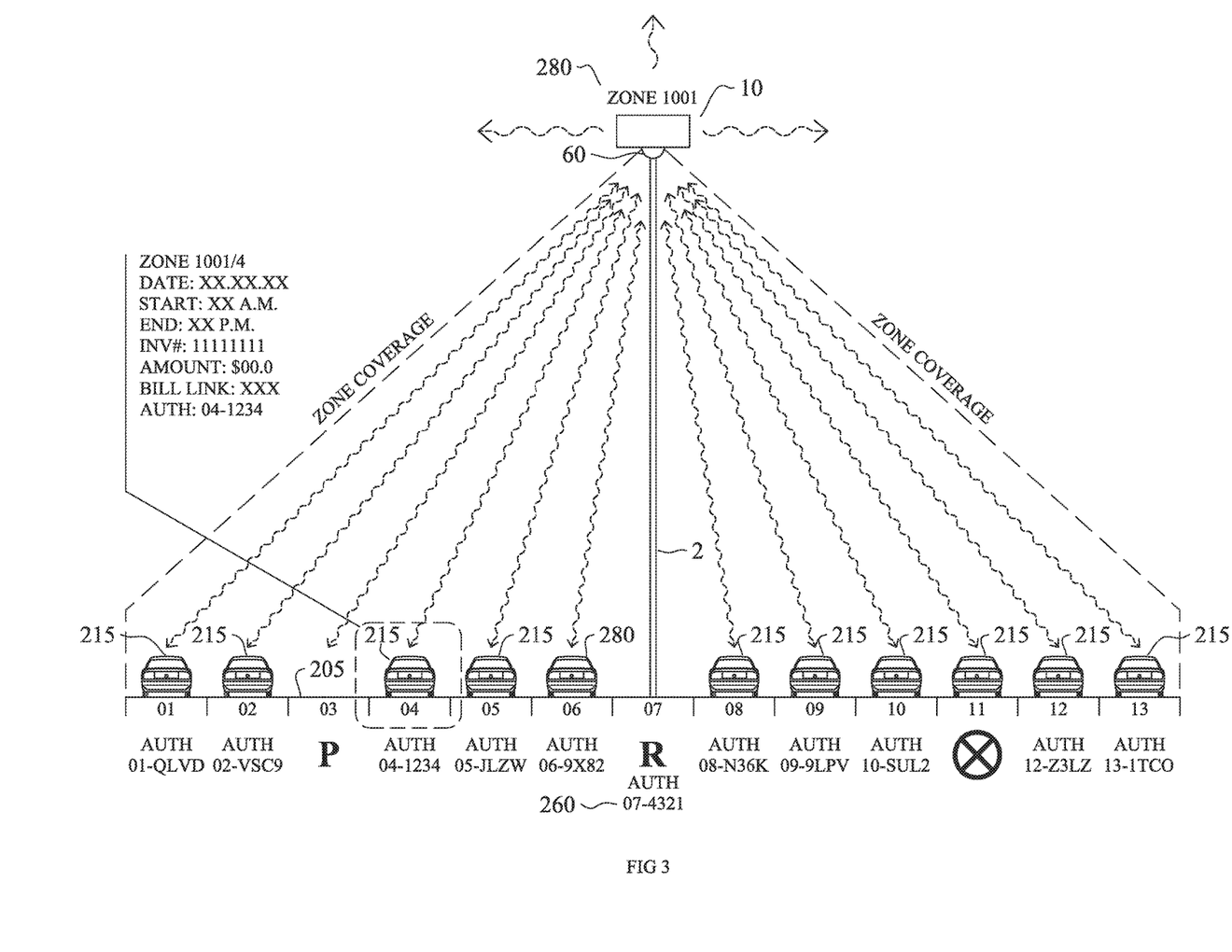
FIG. 3 shows a single pole mounted IDS managing a roadside parking zone, communicatively coupled to other IDS devices, vehicle(s), and remote location(s), according to an embodiment.

FIG. 3 is an enlargement of the FIG. 2 street elevation, showing only the IDS 10 of parking zone 1001. This figure does not appear on the GIS map 210. This figure represents pertinent information about the IDS 10 parking zone 200 parking stalls' 205 status. The IDS 10 with its integral camera 60 coupled to a pole 2 has full visibility over all the vehicle 215 parking stalls 205 within its management parking zone 200. The IDS 10 can also be assisted by neighboring IDS's 10 that can extend the IDS 10 of zone 1001, especially where high profile vehicles 215 or tree branches block or partially block the parked vehicle's 215 full view. Any vehicle 215 authorized to park receives an authorization code 260 which is effectively a lease for the duration the vehicle 215 occupies the parking stall 205. For a parking stall 205 reserved from a remote location, the lease is activated upon making the reservation. The authorization 260 is associated with the parking zone 200 and the parking stall 205 number. The leader on the left side of the figure shows pertinent lease information for the vehicle 215 parked in parking stall 205 number 04. This information can include parking zone 200 and parking stall 205 identification, date and time when the parking stall 205 occupancy has begun, date and time when the parking stall 205 occupancy has ended, an invoice number issued, the billing amount, a link to full billing information, and the authorization code 260 for the lease. This figure shows all parking stalls 205 occupied with the exception of parking stall 205 number 03 showing a vacancy, parking stall 207 number 07 showing reserved with an authorization code 260 07-4321, and parking stall number 205 11 showing a vehicle 215 parked illegally. The illegally parked vehicle's 215 information is communicated to the parking enforcement department after alerting the vehicle driver 275 (if possible). The figure shows the IDS 10 with its integral camera 60 mounted on a pole 2 having bi-directional communication with the parking zone's 200 vehicles 215, neighboring IDS 10 devices, and remote clients.

Figure 4:
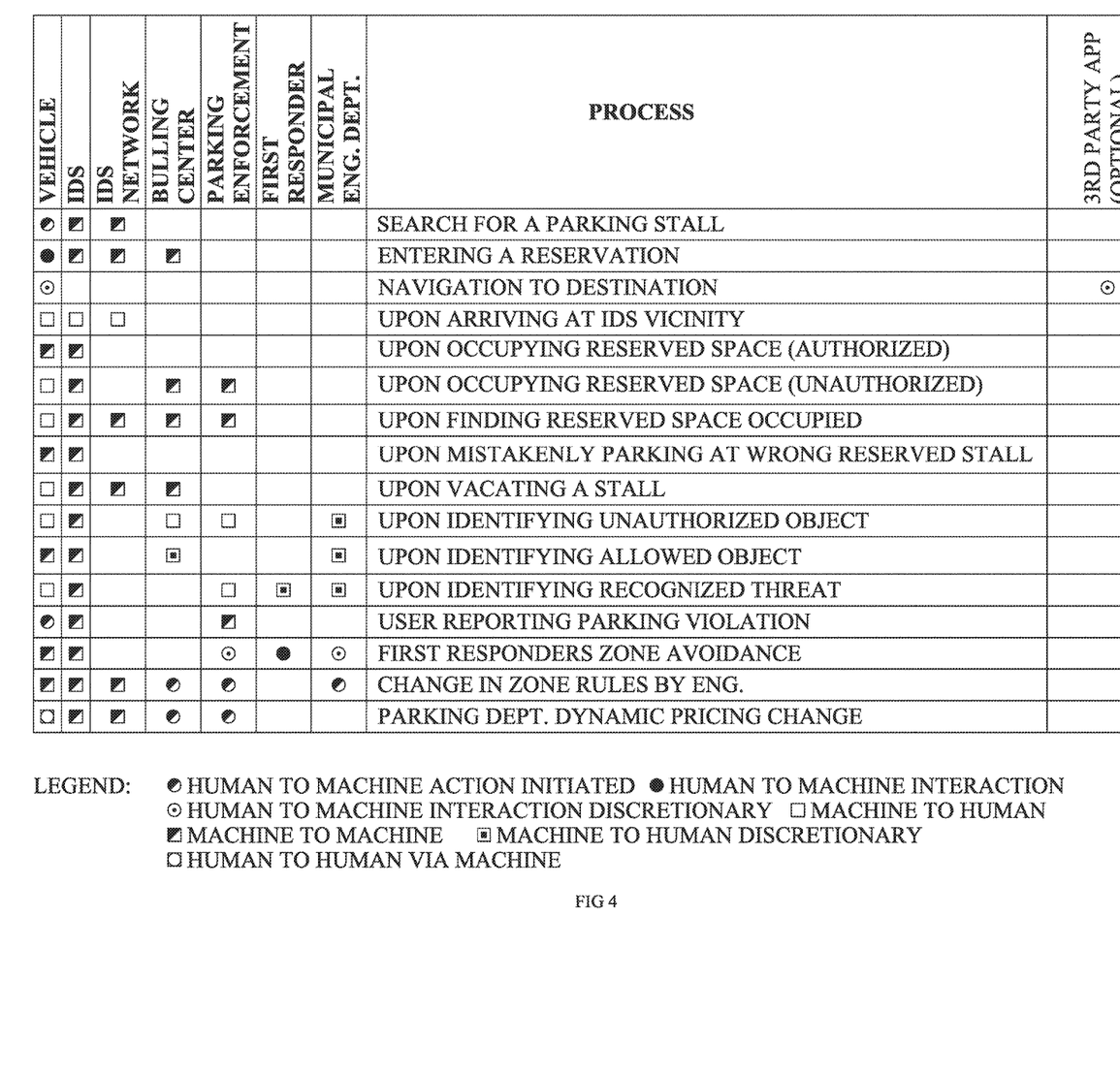
FIG. 4 shows in table format a list of parties associated with the municipal parking system and their respective interactive processes in managing the municipal parking system, according to an embodiment.

FIG. 4 is a table showing processes executed by humans and machines in utilizing the municipal parking management system. The table lists the vehicle mobile 220 and/or portable 230 device, the IDS 10, the IDS 10 network, a billing center, a parking enforcement department, a first responder, and a municipality engineering department, as common clients expected to interact using the municipal parking management system. There may be ancillary clients and apps in addition to the above listed clients. The processes are divided into human to machine, human to human via machine, machine to human, and machine to machine. The processes may include retrieving information only, acting on information resulting in financial or other transactions such as dispatching parking enforcement personnel to a zone. Some of the transactions may be discretionary. For example, a driver may opt to incorporate a useful app with the parking management system app. This diagram represents only a portion of the processes than can be associated with the parking management app. Further, having real time data of all street parking activities throughout the city year-round has many potential uses, including traffic flow analysis, parking utilization analysis, road wear projection, and parking asset value per locality, and so on.

While the principles of the disclosed subject matter have been described in connection with specific apparatus configurations described above, it is to be clearly understood that this description is made only by way of example and not as a limitation on the scope of the disclosed subject matter. For example, embodiments may be implemented in systems having other architectures as well. The various functions or processing blocks discussed herein and illustrated in the Figures may be implemented in hardware, firmware, software or any combination thereof. Further, the phraseology or terminology employed herein is for the purpose of description and not of limitation.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

The particular implementations shown and described are illustrative of the invention and its best mode and are not intended to otherwise limit the scope of the present invention in any way. Indeed, for the sake of brevity, conventional manufacturing, connection, preparation, another functional aspects of the system may not be described in detail.

Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

ELEMENTS

2 Lighting Pole
10 IDS
60 Camera
124 Processor with Resident Memory
126 Transponder/Bi-directional Communication Module
131 AI Code
200 Parking Zone
205 Parking Stall
210 GIS Map
215 Vehicle
220 Mobile Device
225 Embedded Mobile Device
230 Portable Device
250 IDS Unique Address
255 Parking Stall Unique Address
260 Unique Authorization Code
263 Municipal Department/s
267 Third Party
270 Remote Client
275 Driver

The invention claimed is:

1. A decentralized parking management system comprising:
a parking manager device coupled to a pole structure electrically connected to a power source and communicatively coupled to a network of a plurality of pole mounted parking manager devices and at least one of a remote client, a mobile device, or combinations thereof,
wherein the parking manager device includes at least one of a processor, a memory with stored software code, a bi-directional communication module, and a sensor,
wherein the parking manager device is specific to and manages a parking zone within a proximate vicinity of the parking manager device, wherein the managed parking zone includes a plurality of parking stalls,
wherein the parking manager device has a unique address associated with at least one of a street address and a building address,
wherein the managed parking zone and parking stalls are associated with the parking manager device,
wherein the parking manager device communicates data indicating at least one vacant stall of the parking stalls in the managed parking zone, wherein the communication data indicates the unique address of the parking manager device and an indication of at least one vacant stall, and
wherein the communicated data is used to generate an interactive map, for access by a user via a communication network, displaying a location of the vacant stall within a predefined distance of an entered address such that the vacant stall is displayed in real time.

2. The system of claim 1, wherein the interactive map is incorporated into a parking management system application, and wherein the parking management system application is configured to accept input by the user indicative of a reservation of the at least one vacant stall by the user.

3. The system of claim 2, wherein the parking management system application is configured to accept input by the user indicative of a financial verification, and wherein the parking management system application is configured to request, from the user, the financial verification prior to accepting the input indicative of the reservation of the at least one vacant stall.

4. The system of claim 1, wherein the parking stalls of the managed parking zone are configured for pickup and drop off by self-driving vehicles.

5. The system of claim 1, wherein all vehicles parked in a parking stall within the managed zone obtain an electronic authorization that expires in response to the authorized vehicle vacating the parking stall.

6. The system of claim 1, wherein the parking manager device generates an electronic alert in real time in response to detection of an obstruction in one or more of the parking stalls within the managed parking zone.

7. The system of claim 1, wherein user associated with a vehicle that is parked in one of the parking stalls within the managed parking zone without a previously obtained electronic authorization receives an automated electronic warning via the communication network.

8. The system of claim 1, wherein the parking manager device monitors a number of vehicles parked within the managed parking zone.

9. A decentralized parking management system comprising:
a municipal network of a plurality of parking manager devices coupled to pole structures electrically connected to a power source and communicatively coupled to at least one of a remote client and a mobile device,
wherein each parking manager device includes at least one of a processor, a memory with stored software code, a bi-directional communication module, and a sensing device,
wherein each parking manager device is specific to and manages a parking zone within a proximate vicinity of the parking manager device, wherein the managed parking zone includes a plurality of parking stalls,
wherein each parking manager device has a unique address,
wherein the managed parking zone and parking stalls are associated with the parking manager device,
wherein each parking manager device unique address is associated with at least one of a street address and/or a building address,
wherein each parking manager device communicates data indicating at least one vacant stall of the parking stalls in the managed parking zone, wherein the communicated data indicates the address of the parking manager device and an indication of the at least one vacant stall, and wherein the communicated data is used to generate an interactive map displaying a location of the vacant stall for access by a user via a communication network such that the location of the vacant stall is displayed in real time based on an address entered by the user.

10. The system of claim 9, wherein the interactive map is configured to display associated locations of each of a plurality of vacant stalls based on the address entered by the user.

11. The system of claim 9, wherein the interactive map is incorporated into a parking management system application, and wherein the parking management system application is configured to accept user input indicative of a request to be picked up at a predefined pick-up location by a self-driving vehicle and to be dropped off, by the self-driving vehicle, at a predefined drop-off location.

12. The system of claim 9, wherein the interactive map is an added layer within a third party application.

13. The system of claim 9, wherein a first one of the plurality of parking manager devices is configured to provide navigational assistance to a vehicle navigating to the vacant stall located within the managed parking zone of a second one of the plurality of parking manager devices.

14. The system of claim 9, wherein a vehicle located in the parking stall is monitored based on a signal input, a video input, or a combination thereof.

15. The system of claim 9, wherein the parking manager communicates using at least one of a human to machine communication, a human to human via a machine communication, a machine to machine communication, and a machine to human via a machine communication.

16. The system of claim 9, wherein a parking fee is dynamically set and is changed based on at least one of time of day, event, demand, and/or day of the week.

17. A parking management system comprising:
an interactive parking map application configured to provide navigation to at least one of a plurality of parking stalls,
wherein the parking map application is accessible via a communication network,
wherein the interactive parking map application is configured to accept user input including a user address,
wherein the interactive parking map application is configured to display, in real time, at least one vacant stall of a plurality of parking stalls, wherein the displayed vacant stall is located within a predefined distance from the user address, and
wherein the displayed vacant stall is generated based on communication data received via the communication network from a pole-mounted parking manager device that is associated with and specific to a managed parking zone, wherein the communication data indicates an address of the parking manager device of the at least one vacant stall.

18. The system of claim 17, wherein the interactive parking map application is configured to accept input by the user indicative of a reservation of the vacant stall by the user.

19. The system of claim 17, wherein the interactive parking map application is configured to communicate with one of a human-operated vehicle and a self-driving vehicle to provide navigation assistance to a predefined pick-up location or a predefined drop-off location.

20. A method of providing a parking management system that includes a parking manager device that is specific to and associated with a parking zone having a plurality of parking stalls, wherein the parking manager device is coupled to a pole structure electrically connected to a power source and communicatively coupled to a plurality of other parking manager devices and at least one of a remote client, a mobile device, or a combination thereof, the method comprising:
assigning a unique address to the parking manager device, wherein the unique address is different than addresses of the plurality of other parking manager devices;
associating the unique address of the parking manager device with at least one of a street address or a building address; and
in response to receiving communication data from the parking manager device indicating that at least one of the associated parking stalls is vacant, displaying an indication of the at least one vacant stall on an interactive map for access by a user via the remote client, the mobile device, or the combination thereof,
wherein the indication of the at least one vacant stall is displayed in association with the at least one of the street address or the building address of the parking manager device.

21. The method of claim 20, further comprising assigning a unique sub-address to each of the parking zone and parking stalls within the associated parking zone, wherein the indication of the at least one vacant stall is displayed in association with the unique sub-address of the at least one vacant stall.

22. The system of claim 1, wherein the managed parking zone and parking stalls each have unique sub-addresses, and wherein the communicated data indicates the unique sub-address of the at least one vacant stall.

23. The system of claim 9, wherein the managed parking zone and parking stalls are associated with the parking manager device and each have unique sub-addresses associated with the parking manager device, and wherein the communicated data indicates the address of the parking manager device and the unique sub-address of the at least one vacant stall.

24. The system of claim 17, wherein the communication data indicates a unique sub-address of the at least one vacant stall.

25. The system of claim 1, wherein parking stall occupancy is determined, by the parking manager device, based on a visual inspection and at least one of data received a wireless communication and a user's manual data input via an interface associated with the parking manager device.

26. The system of claim 9, wherein parking stall occupancy is determined, by the parking manager device, based on a visual inspection and at least one of data received a wireless communication and a user's manual data input via an interface associated with the parking manager device.

27. The system of claim 17, wherein parking stall occupancy is determined, by the parking manager device, based on a visual inspection and at least one of data received a wireless communication and a user's manual data input via an interface associated with the parking manager device.

28. The method of claim 20, wherein parking stall occupancy is determined, by the parking manager device, based on a visual inspection and at least one of data received a wireless communication and a user's manual data input via an interface associated with the parking manager device.

* * * * *